(No Model.)
R. STONE.
GRAPPLE.
No. 271,538. Patented Jan. 30, 1883.
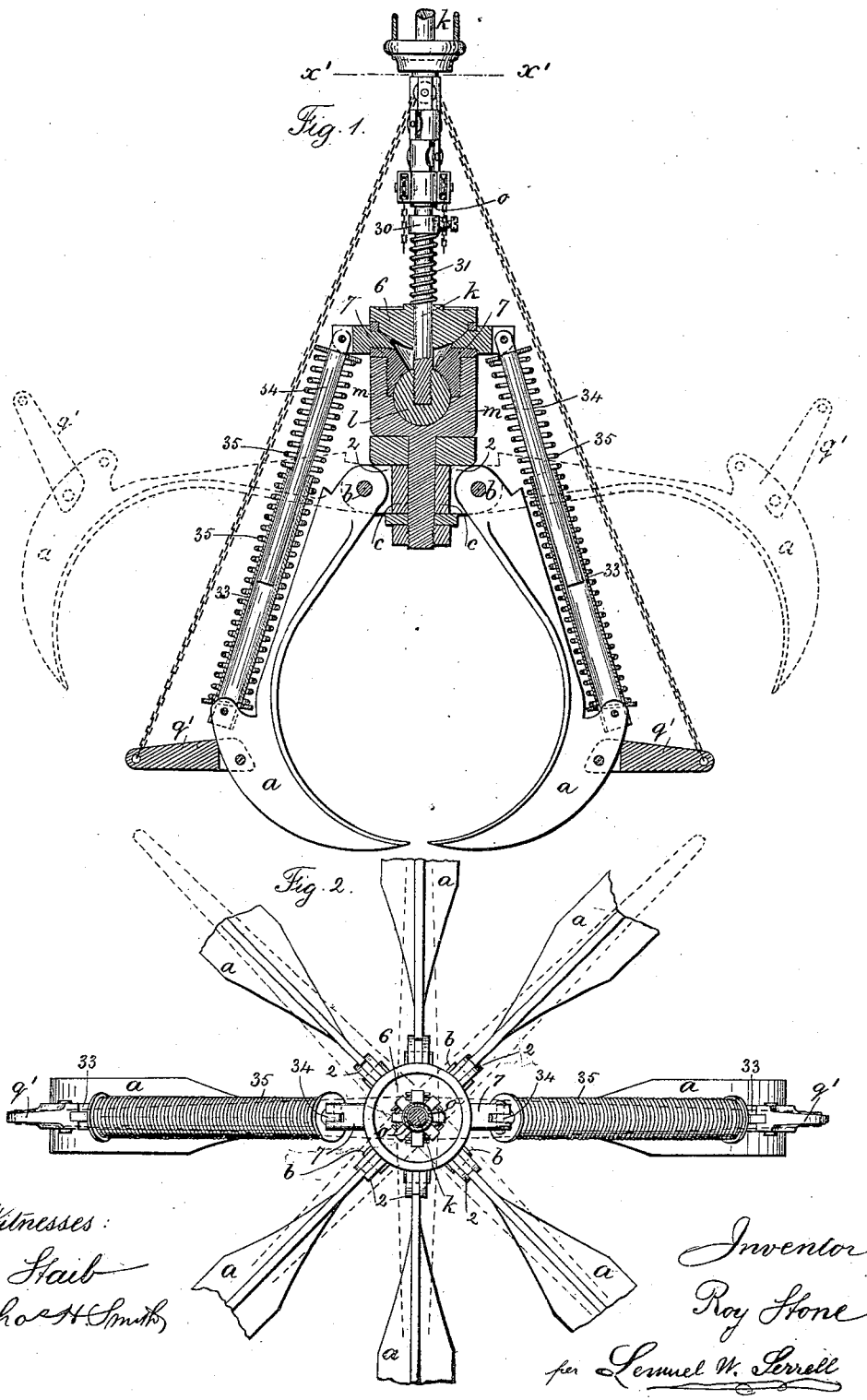

UNITED STATES PATENT OFFICE.

ROY STONE, OF NEW YORK, N. Y.

GRAPPLE.

SPECIFICATION forming part of Letters Patent No. 271,538, dated January 30, 1883.

Application filed October 20, 1882. (No model.)

*To all whom it may concern:*

Be it known that I, ROY STONE, of the city and State of New York, have invented an Improvement in Grapples, of which the following is a specification.

In Letters Patent No. 262,330, granted to me August 8, 1882, a circular range of radial claws is provided, the same being hinged at their inner ends to joints around a crown-plate, there being also bow-springs between the claws and a central plate. In cases where the grapple is dropped in an open condition, and one or two of the claws strike on a rock or hard substance and the others are unsupported, there is a heavy concussion and strain on the joints of these claws, that is liable to injure the same.

One portion of my invention consists of a sliding brace extending from the back of each claw to the exterior of the socket, and said sliding brace is preferably composed of a tube with a rod sliding in it, and around the same is a helical spring.

By these improvements on my aforesaid invention and patent the parts are rendered stronger and more efficient, and risk of injury is very much lessened.

A reference is hereby made to my aforesaid patent, and where the same letters of reference are employed they will be found to apply to the same parts.

In the drawings, Figure 1 is a vertical section through the grapple, and Fig. 2 is a partial sectional plan below the line $x'\ x'$.

The hooked claws $a$ are jointed at $b$ to the joint-plates 2 of the crown-piece $c$, which is at the lower end of the socket $m$. In this socket $m$ is the ball $l$ at the lower end of the stem.

The coupling-pieces 6 and 7 are similar to those in the aforesaid patent, and the operations of the parts are the same, except that instead of a weight to keep the couplings together I employ a spring, as intimated in said patent, a helical spring around the stem $o$, and I place a movable collar, 30, above the spring 31, and hold the same by a clamp-screw, so that the desired force can be exerted upon the couplings before they will separate. This adjustment of the pressure that holds the couplings 6 and 7 together is of primary importance, because the couplings separate, not by the lifting action of a slide-tube, as in said patent, but by the conical surface of the coupling 6 sliding out of the conical cup 7 when the claws on one side are unsupported, so that the weight of the instrument is sufficient to turn the claws and their crown-joint at an inclination to the stem and upon the ball-and-socket joint of that stem. This allows the couplings 6 and 7 to act independently of the lifting devices and to hold the parts properly in position; and where the weight that is being raised is heavier at one side than the other the claws and crown-joint turn on the ball, so that the stem is in line with the center of gravity, or nearly so.

The two-part braces 33 and 34 are hinged at their ends to the back parts of the claws $a$ and the exterior of the coupling 7, respectively, the hinge-pieces at the said coupling 7 projecting as a crown of jaws around such coupling, or being made of separate pieces screwed or otherwise fastened to place. These two-part braces may be slotted, so that one slides upon the other; but I prefer to make the part 33 tubular in which the rod 34 slides. This allows the claws to close upon the article to be raised; but when the claw is entirely opened, the rod 34, touching the heel of the claw at the end of the pipe, forms a stop that strengthens the claw against upward pressure and relieves the hinge from undue strain.

Around the two-part brace there is an expansive helical spring, 35, that serves to press the outer end of the claw downwardly and close it upon the article to be grasped.

It is understood the claws stand radially around the crown-piece, and that each claw is provided with a compound brace and spring; and I remark that the grapple is to be lowered in an open condition, the claws being drawn up by the action of a wheel that winds a chain upon its shaft, and draws up a sliding tube with sheaves that act upon chains similarly to the devices in my former patent; but instead of having one chain to each pair of opposite claws, said chain going through a single block at one side of the stem, I make use of an endless chain to each pair of opposite claws, said chain passing at each side of the central stem over sheaves attached to the sliding sleeve $o$.

These sheaves are placed in pairs on opposite surfaces of the sleeve o, and one pair above the other angularly, so that the chains will draw straight without interfering with each other.

The object in using endless chains instead of single chains is to cause the pull of the chains in opening the claws to be uniform, and not to tend to bind the joints of the claws by a greater strain at one side of the claw than at the other side. I am able also to use stationary sheaves upon the sleeve, instead of suspended blocks.

It is to be understood that the endless chains passing through eyes on the arms $q'$ will be under equal tension throughout. However, two chains fastened at their ends to said arms might take the place of the endless chain. Under either condition the chains to each pair of claws will be double.

I claim as my invention—

1. The combination, with the claws and their crown-joints, of two-part braces extending from the backs of the claws to the outside of the socket, substantially as set forth.

2. The combination, with the claws, their crown-joints, and stem, of two-part braces, hinged at their ends, and helical springs surrounding such braces, substantially as set forth.

3. The combination, with the claws, their crown-joints, the stem, the couplings 6 and 7, and the ball-and-socket joints, of the spring surrounding the stem and the adjustable collar, substantially as set forth.

4. The combination, with the stem, the claws, and their crown-joint, of double chains to each pair of opposite claws, the sheaves, sleeve, and mechanism for moving the sleeve, substantially as set forth.

Signed by me this 17th day of October, A. D. 1882.

ROY STONE.

Witnesses:
GEO. T. PINCKNEY,
WILLIAM G. MOTT.